(No Model.)
H. CARMAN.
ADJUSTABLE SAW GUIDE.
No. 270,387. Patented Jan. 9, 1883.
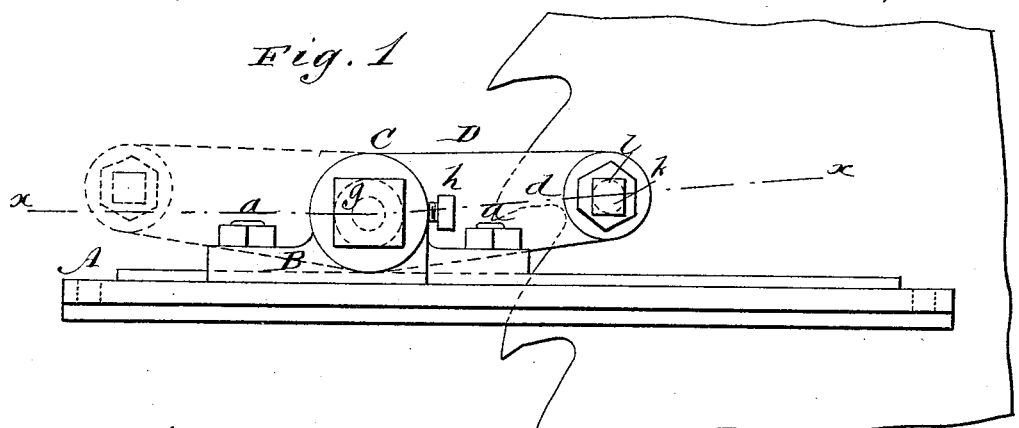
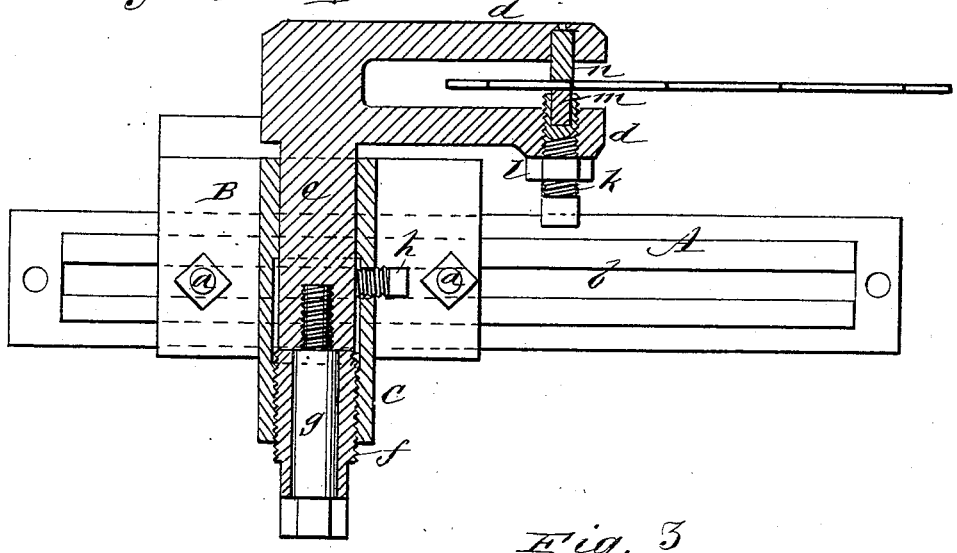
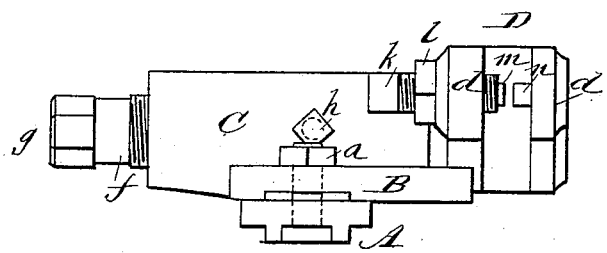
WITNESSES:
C. Neveux
C. Sedgwick
INVENTOR:
H. Carman
BY Munn & Co.
ATTORNEYS.

UNITED STATES PATENT OFFICE.

HIRAM CARMAN, OF PORTLAND, ASSIGNOR TO HYDE, KLIME & CO., OF RIDGWAY, PENNSYLVANIA.

ADJUSTABLE SAW-GUIDE.

SPECIFICATION forming part of Letters Patent No. 270,387, dated January 9, 1883.

Application filed September 30, 1882. (No model.)

*To all whom it may concern:*

Be it known that I, HIRAM CARMAN, of Portland, in the county of Elk and State of Pennsylvania, have invented a new and Improved Adjustable Saw-Guide, of which the following is a full, clear, and exact description.

The object of my invention is to do away with the ordinary and dangerous mode of setting or guiding circular saws. By the ordinary method the saws are guided while in motion by means of two set-screws—one on each side—carried by stationary jaws. In my improved guide the jaws are made adjustable by means of a screw, so that they can be moved to guide the saw while the saw is in motion without danger to the sawyer, as hereinafter described and claimed.

Reference is to be had to the accompanying drawings, forming a part of this specification, in which similar letters of reference indicate corresponding parts in all the figures.

Figures 1 is a side view of my improved guide, showing the same as applied to a saw. Fig. 2 is a horizontal section of the same. Fig. 3 is an end view.

A is the base or support of the guide, which is to be attached to the saw-bed or other suitable support at the side of the saw.

B is a slide-block attached to the base A by means of screw-bolts *a*, which pass through a longitudinal slot, *b*, in the base, so that the block may be adjusted and fixed in the length of the slot. The block B is provided with a tubular box, C, for receiving the stem or shank of the guide proper.

D is the guide, which is formed with two jaws, *d d*, projecting from the end of the stem or shank *e*, which enters the box C. In the opposite end of the box C is fitted a tubular nut, *f*, through which passes a bolt, *g*, the inner end of which is screw-threaded and enters a hole formed in the end of the shank *e*. This construction allows of the sidewise adjustment of the guide, so as to bring the jaws *d* in proper position relative to the saw. At the same time the guide can be turned in the box away from the saw, as shown in dotted lines in Fig. 1; and for holding the guide in either position the box is provided with a set-screw, *h*, in one side. In the end of one jaw, *d*, is a set-screw, *k*, which is provided with a set-nut, *l*, and its inner end is made hollow and fitted with a wooden plug, *m*, which projects from the end of the screw. In the other jaw, *d*, a wooden plug, *n*, is fitted.

In using the guide, after it has been properly adjusted on the base A, the thickness of the saw is taken by turning the set-screw *k* in or out, thereby moving the plug *m* in the end of the screw to or from the stationary plug in the opposite jaw. The jaws can then be moved to properly guide the saw by means of the screw *f*, which, being at a distance from the saw, allows adjustment without danger to the operator. The stationary plug *n* is on the side of the saw nearest the carriage, and being entirely within the jaw, there is no projection for anything to catch upon. The guide can be thrown back when a saw is to be removed, and in that position gives ample room for the work. By the jaws being hung in the box C they can be reversed to suit either a right or a left hand mill.

Having thus described my invention, I claim as new and desire to secure by Letters Patent—

The block B, provided with the screw-threaded cylindric box C, having the holding-screw *h*, in combination with the guide D, having jaws *d*, provided with the plugs *m n*, said guide having a cylindric shank, *e*, fitted into the box C, the tubular screw-threaded sleeve *f*, working in the screw-threaded box C, and the adjusting-screw *g*, bearing in the sleeve *f* and working in the end of the guide-shank *e*, substantially as and for the purpose set forth.

HIRAM CARMAN.

Witnesses:
GEO. W. LONG,
WILSON G. READINGER.